United States Patent

[11] 3,540,461

[72] Inventor Larry S. Smith
 Goshen, Indiana
[21] Appl. No. 799,613
[22] Filed Feb. 17, 1969
[45] Patented Nov. 17, 1970
[73] Assignee Robertshaw Controls Company
 Richmond, Virginia
 a corporation of Delaware

[54] PNEUMATIC CONTROL SYSTEM AND CONTROL DEVICE THEREFOR OR THE LIKE
 20 Claims, 6 Drawing Figs.
[52] U.S. Cl. .................................................. 137/85
[51] Int. Cl. .................................................. F15b 5/00,
 G05d 16/00
[50] Field of Search ........................................ 137/85,
 596, 18, 116.5

[56] References Cited
 UNITED STATES PATENTS
 2,501,957 3/1950 Moore .................. 137/85
 3,295,544 1/1967 Mueller .................. 137/85

Primary Examiner—Alan Cohan
Attorneys—Candor, Candor and Tassone, Robert L. Marben and Auzville Jackson, Jr.

ABSTRACT: This disclosure relates to a control device comprising a housing carrying two separate one-piece flexible diaphragms in stacked relation and cooperating therewith to define a pilot chamber, an exhaust chamber and a branch pressure chamber in stacked relation, one of the diaphragms having an opening passing therethrough and defining opposed resilient valve seats respectively leading to said exhaust chamber and said branch chamber. The housing has a stationary valve seat separating a main pressure chamber from said branch chamber and is adapted to be opened and closed by a valve member disposed in the main chamber and projecting through the stationary valve seat into the branch chamber to control and be engageable by one of the resilient valve seats of the one diaphragm, the other resilient valve seat of the one diaphragm being controlled and engageable by the other of the diaphragms. The housing provides a leakage passage means around a conduit thereof to provide fluid communication between the exhaust chamber and the atmosphere.

Patented Nov. 17, 1970

3,540,461

INVENTOR
LARRY S. SMITH

BY

Cauden & Cauden

HIS ATTORNEYS

INVENTOR
LARRY S. SMITH

BY *Caudn & Caudn*

HIS ATTORNEYS 3,540,461

PNEUMATIC CONTROL SYSTEM AND CONTROL DEVICE THEREFOR OR THE LIKE

This invention relates to an improved pneumatic control system and to an improved control device for such a system or the like.

It is well known that pneumatic relays have been provided wherein a pressure source is adapted to be directed to a pneumatically operated device substantially proportionally to the pressure of a pneumatic signal being directed to such relay so that a change in the pressure of the pneumatic signal causes a proportional change in the fluid pressure being directed to the pneumatically operated device.

It is a feature of this invention to provide such a relay wherein the parts are simple to manufacture and assemble while providing an accurate control.

For example, the disclosed embodiment of this invention provides a housing carrying two separate one-piece flexible diaphragms in stacked relation and cooperating with the housing to define a pilot pressure chamber, an exhaust chamber and a branch pressure chamber in stacked relation, one of the diaphragms having opening means passing therethrough and defining opposed resilient valve seats respectively leading to said exhaust chamber and to said branch chamber. The housing carries a stationary valve seat that is adapted to interconnect the main pressure chamber with the branch chamber, the valve seat being opened and closed by a valve member disposed in the main chamber and projecting through the stationary valve seat into the branch chamber to control and be engageable by one of the resilient valve seats of the one diaphragm. The other resilient valve seat of the one diaphragm is controlled and engageable by the other of the diaphragms. The housing includes a nipple or conduit means for interconnecting the pilot pressure signal to the pilot chamber with such nipple means passing loosely out of an opening provided in the housing so that a leakage passage means is disposed about such conduit. The exhaust chamber is fluidly interconnected to such leakage passage to provide means for interconnecting the exhaust chamber to the atmosphere.

Accordingly, it is an object of this invention to provide an improved pneumatic control system having one or more of the novel features of this invention as set forth above or hereinafter shown or described.

Another object of this invention is to provide an improved control device for such a system or the like, the control device of this invention having one or more of the novel features of this invention as set forth above or hereinafter shown or described.

Other objects, uses and advantages of this invention are apparent from a reading of this description which proceeds with reference to the accompanying drawings forming a part thereof and wherein.

Figure 1:
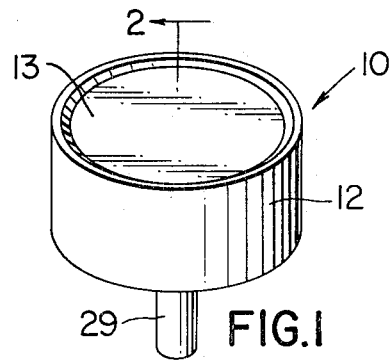
FIG. 1 is a perspective view of the improved control device of this invention.

While the various features of this invention are hereinafter described and illustrated as being particularly adaptable to provide a pneumatic control system for operating a pneumatically operated heat exchanging device, it is to be understood that the various features of this invention can be utilized singly or in any combination thereof to provide control means for other systems as desired.

Therefore, this invention is not to be limited to only the embodiment illustrated in the drawings, because the drawings are merely utilized to illustrate one of the wide variety of uses of this invention.

Figure 2:
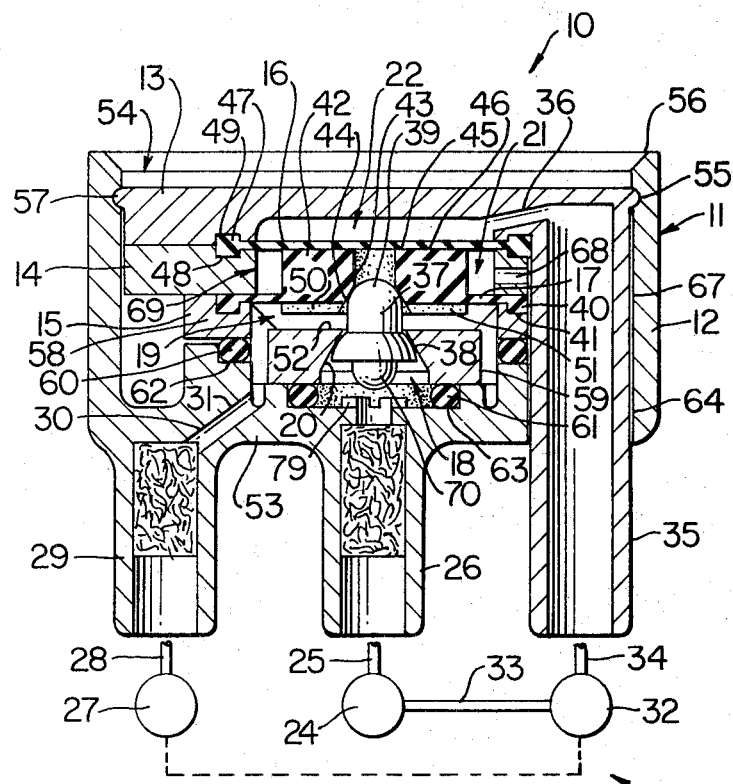
FIG. 2 is an enlarged, cross-sectional view taken on line 2-2 of FIG. 1 and illustrates the control device of this invention as utilized in the pneumatic control system of this invention.

Referring now to FIGS. 1 and 2, the improved control device of this invention is generally indicated by the reference numeral 10 and comprises a housing means 11 formed from a plurality of housing members 12, 13, 14 and 15 assembled together in a manner hereinafter described to cooperate with two separate one-piece flexible diaphragms 16 and 17 carried thereby to define a main pressure chamber 18 separated from a branch pressure chamber 19 by a stationary valve seat 20 formed in the housing member 15, an exhaust chamber 21 and a pilot pressure chamber 22.

The control device 10 of this invention is adapted to be utilized in a pneumatic control system of this invention generally indicated by the reference numeral 23 in FIG. 2 and comprising a pneumatic pressure source 24 adapted to be fluidly interconnected by a conduit 25 to an integral nipple extension 26 on the housing member 12 that leads to the main pressure chamber 18.

A pneumatically operated device 27, such as a pneumatically operated heat exchanger means which has its output temperature effect increased upon an increase of pressure fluid being directed thereto and having its output temperature effect decreased upon a decrease of pneumatic pressure being directed thereto, is fluidly interconnected by a conduit means 28 to an integral nipple extension 29 on the housing member 12 that leads to the branch pressure chamber 19 by interconnecting passage means 30 and 31 respectively formed in the housing members 12 and 15. A condition responsive device 32 is provided to sense the output temperature effect of the pneumatically operated heat exchanger 27 and is adapted to be manually set to a desired output temperature effect that the heat exchanger 27 is to produce. The device 32 is interconnected by a conduit means 33 to the pneumatic source 24 and will fluidly interconnect a pneumatic signal from that pneumatic source 24 through a conduit 34 and an integral nipple extension or conduit means 35 of the housing member 13 to the pilot chamber 22 through a passage 36 formed in the housing member 13 in a manner hereinafter described.

A movable valve member 37 is disposed in the main pressure chamber 18 and has a substantially frustoconical enlargement 38 adapted to open and close the stationary valve seat 20 while having an extension 39 projecting into the branch chamber 19.

The flexible diaphragm 17 has an outer peripheral bead means 40 received in an annular groove 41 formed in the housing member 15 so as to be sealingly secured between facing surfaces of the housing members 14 and 15, the flexible diaphragm 17 having an upwardly directed substantially cylindrical projection 42 integral therewith and having an opening means 43 passing centrally therethrough to define a substantially frustoconical resilient valve seat 44 at one end thereof to be opened and closed by the rounded projection 39 of the valve member 37 for a purpose hereinafter described. The opening 43 in the flexible diaphragm 17 also defines another resilient valve seat 45 at the upper surface 46 of the cylindrical projection 42 which is adapted to be opened and closed by the flexible diaphragm 16, the flexible diaphragm 16 having an outer peripheral bead means sealingly disposed within cooperating groove means 48 and 49 formed in the facing surfaces of the housing members 14 and 13 to sealingly secure the flexible diaphragm 16 thereto.

Figure 6:
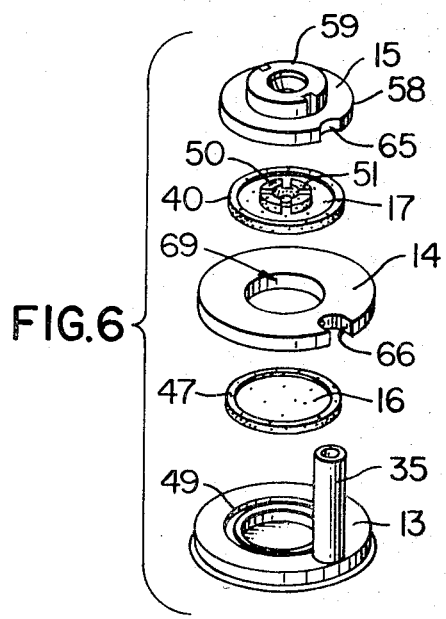
FIG. 6 is a reverse perspective view of certain of the parts of FIG. 5 to illustrate the other sides thereof.

As illustrated in FIGS. 2 and 6, another integral cylindrical projection 50 extends downwardly from the flexible diaphragm 17 and has a plurality of radially disposed slots 51 formed therein so that when the projection 50 abuts against the top surface 52 of the valve seat 20 in a manner hereinafter described, the projection 50 will not seal the valve seat 20 from the branch chamber 19.

The housing member 12 of the control device 10 is substantially cup-shaped to define a closed end wall 53 and an open end 54, the housing member 12 having an annular groove 55 disposed therein adjacent the outer free end 56 thereof to snap fittingly receive an outwardly directed annular tongue 57 of the housing member 13 to secure all of the parts of the control device 10 in stacked relation within the open end 54 of the housing member 12.

The housing member 15 has an outer portion 58 stepped from an inner portion 59 thereof that defines the valve seat 20. A pair of resilient O-rings 60 and 61 are adapted to be respectively disposed between the stepped portions 58 and 59 of the housing member 15 and cooperating annular shoulder means 62 and 63 on the end wall 53 of the housing member 12 to fluidly seal the main pressure chamber 18 from the branch pressure chamber 19 in the assembled relation illustrated in FIG. 2.

The housing member 12 has an opening 64 passing through the closed end wall 53 thereof to be aligned with cooperating cutouts 65 and 66 in the outer peripheries of the housing members 15 and 14 so as to provide a passage means 67 to telescopically receive the conduit or nipple extension 35 of the housing member 13 when the housing members 12—15 and other parts of the control device 10 are disposed in their assembled relation as illustrated in FIG. 2 whereby the snap-fit relation between the housing members 12 and 13 stabilizes the conduit 35 within the passage means 67 to provide a leakage passage means 67 completely about the conduit 35 of the housing member 13 that leads to the atmosphere.

The housing member 14 can have a radial passage 68 disposed therein to interconnect the leakage passage means 67 to a central opening 69 formed therein which defines the exhaust chamber 21 with the flexible diaphragms 16 and 17 whereby the exhaust chamber 21 is always interconnected to the atmosphere by means of the passage 68 and the leakage passage means 67 about the conduit 35. However, it is to be understood that the exhaust chamber 21 could be interconnected to the leakage passage 67 by forming a groove in the top or bottom surface of the housing member 14 adjacent the flexible diaphragm 16 or the flexible diaphragm 17, if desired.

Figure 5:
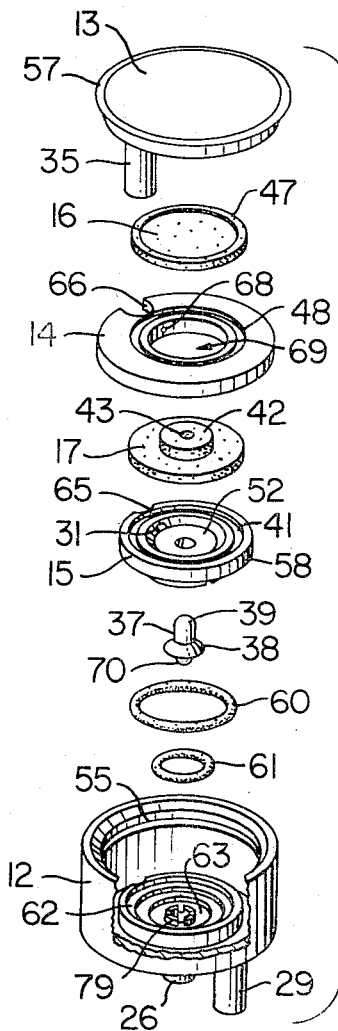
FIG. 5 is an exploded perspective view illustrating the various parts of the control device of this invention.

From the above description of the various parts of the control device 10 of this invention, it can readily be seen that the housing members 12—15 can be formed in a simple manner, such as from molded plastic or the like, and the various parts of the control device 10 can be assembled together without any stacking, riveting or other subassembly operations as all of the parts can be readily disposed into the open end 54 of the cup-shaped housing member 12 as illustrated in FIG. 5 to be subsequently secured together by the snap-fit relation between the housing member 13 and the housing member 12 to provide a compact and economical pneumatic relay to be utilized in the control system 23 of this invention in a manner now to be described.

In the operation of the control system 23 of this invention, it is first assumed that the output temperature effect of the pneumatically operated heat exchanger means 27 is at the selected output temperature effect setting of the sensing means 32 so that the control device 10 is in the position as illustrated in FIG. 2 wherein the valve member 37 is not only closing the stationary valve seat 20 to prevent fluid communication between the main pressure chamber 18 and the branch pressure chamber 19, but also the valve member 37 is closing the opening means 43 of the flexible diaphragm 17 by seating against the resilient valve seat 44 so as to prevent fluid communication between the branch pressure chamber 19 and the exhaust chamber 21. Likewise, the flexible diaphragm 16 is closed against the resilient valve seat 45 of the flexible diaphragm 17 to also prevent fluid communication between the branch pressure chamber 19 and the exhaust chamber 21. Such position of the control device 10 is provided by the fact that the pneumatic pressure signal being directed by the condition responsive means 32 to the pilot pressure chamber 22 is in balance with the pressure in the branch pressure chamber 19 so that the pressure being delivered by the branch pressure chamber 19 to the pneumatically operated heat exchanger device 27 maintains the same in an operating position that is producing the selected output temperature effect thereof.

However, should the condition responsive means 32 sense a decrease in the output temperature effect of the pneumatically operated heat exchanger means 27 a certain amount below the output temperature effect setting of the sensing means 32, the device 32 increases the pressure of the pneumatic signal being directed to the pilot pressure chamber 22 so that such increased pressure in the pilot pressure chamber 22 moves the flexible diaphragm 16, flexible diaphragm 17 and valve member 37 downwardly in the manner illustrated in FIG. 3 to cause the valve member 37 to open the valve seat 20 while maintaining the resilient valve seats 44 and 45 closed whereby the main pressure chamber 18 is now interconnected to the branch pressure chamber 19 to increase the pressure in the branch chamber 19 and, thereby, increase the branch pressure now being delivered to the pneumatically heat exchanger device 27 to cause the same to increase its temperature output effect substantially proportionally to the increased pressure in the pilot chamber 22. It can be seen that the grooves 51 in the extension 50 of the diaphragm 17, even if the same bottoms against the surface 52 of the housing member 15 in the position illustrated in FIG. 3, maintains fluid communication between the opened valve seat 20 and the branch pressure chamber 19. The end wall 53 of the housing member 12 has upwardly directed spaced abutments 79 against which the lower end 70 of the valve member 37 abuts when the diaphragm 17 bottoms out against the surface 52 of the housing member 15 so that fluid communication is maintained between the nipple extension 26 and the main chamber 18 so that fluid communication will be maintained between the pressure source 24 and the branch chamber 19 when the relay is in the position of FIG. 3.

Figure 3:
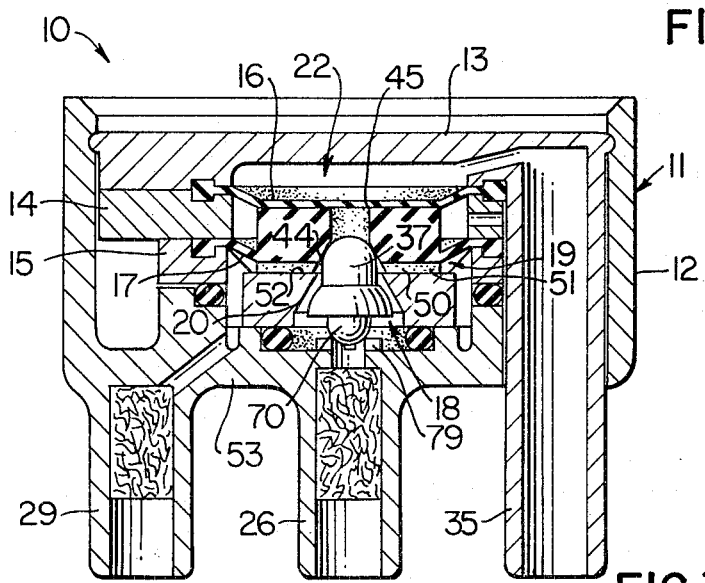
FIG. 3 is a view similar to FIG. 2 and illustrates the control device in another operating position thereof.

The control device remains in the position illustrated in FIG. 3 until the condition responsive means 32 senses that the pneumatically operated heat exchanger means 27 is now producing the selected output temperature effect setting of the condition responsive means 32 whereby the condition responsive means 32 reduces the signal pressure to the pilot pressure chamber 22 so that the control device 10 can be returned again to the position illustrated in FIG. 2.

Figure 4:
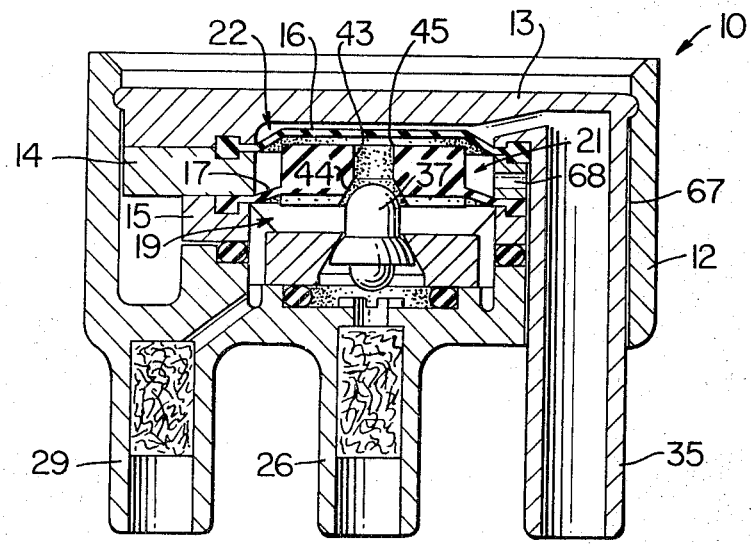
FIG. 4 is a view similar to FIG. 2 and illustrates the control device of this invention in another operating position thereof.

Conversely, if the condition responsive means 32 senses that the output temperature effect of the pneumatically operated heat exchanger means 27 is exceeding the output temperature effect setting of the condition responsive means 32 a certain amount, the condition responsive means 32 proportionally decreases the pneumatic signal being directed thereby to the pilot chamber 22 whereby the resulting pressure differential between the chambers 19 and 22 causes the flexible diaphragm 17 to move upwardly and move the flexible diaphragm 16 therewith and slightly beyond the same to not only open the resilient valve seat 44 away from the valve member 37, but also to open the flexible diaphragm 16 away from the other resilient valve seat 45 as illustrated in FIG. 4 so that the branch chamber 19 is now fluidly interconnected to the exhaust chamber 21 through the opened opening means 43 of the flexible diaphragm 17. Since the exhaust chamber 21 is always disposed in fluid communication with the atmosphere through the passage means 68 in housing member 14 and the leakage passage means 67 disposed about the conduit means 35 of the housing member 13, the pressure in the chamber 19 now decreases so as to decrease the branch pressure being directed to the pneumatically operated heat exchanger device 27 whereby the heat exchanger device 27 now decreases its output temperature effect proportionally to the change in the pneumatic signal directed to the pilot chamber 22 that caused the control device 10 to assume the position illustrated in FIG. 4.

The control device 10 remains in the position illustrated in FIG. 4 until the condition responsive means 32 senses that the output temperature effect of the heat exchanger 27 has now been reduced to the output temperature effect setting of the condition responsive means 32 whereby the condition responsive means 32 increases the pneumatic signal to the pilot chamber 22 to cause the parts thereof to again return to the position illustrated in FIG. 2.

Therefore, it can be seen that the control system 23 of this invention operates in a unique manner to maintain the output temperature effect of the heat exchanger means 27 at the selected output temperature effect setting of the condition responsive means 32.

Accordingly, it can be seen that this invention not only provides an improved pneumatic control system, but also this invention provides an improved pneumatic control device for such a system or the like.

I claim:

1. A pneumatic control device comprising a housing means carrying two separate one-piece flexible diaphragms in stacked relation and cooperating therewith to define first, second and third chambers in stacked relation, one of said diaphragms having opening means passing therethrough and defining opposed resilient valve seats respectively leading to said second chamber and to said third chamber, said housing means having a stationary valve seat and a fourth chamber with said stationary valve seat being adapted to interconnect said fourth chamber and said third chamber together, and a valve member disposed in said fourth chamber and projecting through said stationary valve seat into said third chamber to control and be engageable by one of said resilient valve seats of said one diaphragm, said other resilient valve seat of said one diaphragm being controlled and engageable by the other of said diaphragms.

2. A pneumatic control device as set forth in claim 1 wherein said one diaphragm has an integral central enlargement projecting outwardly therefrom toward said other diaphragm, said opening means passing through said enlargement to define said other resilient valve seat of said one diaphragm at the free end of said enlargement.

3. A pneumatic control device as set forth in claim 1 wherein said housing means comprises a plurality of housing members disposed in stacked relation, one of the outboard housing members being substantially cup-shaped with a closed end and an open end, the remaining housing members being disposed in stacked relation in said open end of said cup-shaped housing member.

4. A pneumatic control device as set forth in claim 3 wherein said one outboard housing member and the other housing member respectively have means snap-fitting the same together whereby said housing members are held together in stacked relation.

5. A pneumatic control device as set forth in claim 1 wherein said housing means comprises a plurality of housing members secured together in stacked relation, one of said housing members having nipple means fluidly interconnected to said first chamber, other of said housing members having aligned openings telescopically and loosely receiving said nipple means to define leakage passage means therebetween, said device having means fluidly interconnecting said second chamber to said leakage passage means.

6. A pneumatic control device comprising a housing means carrying two diaphragm means in stacked relation and cooperating with said housing means to define first, second and third chambers in stacked relation, one of said diaphragm means having opening means passing therethrough fluidly interconnecting said second chamber and said third chamber together, other of said diaphragm means being adapted to open and close said opening means to respectively permit and prevent fluid communication between said second and third chambers, said housing means having conduit means fluidly interconnecting the exterior thereof with said first chamber, said housing means having an opening therein telescopically and loosely receiving said conduit means to define leakage passage means therebetween leading to the exterior of said housing means, said device having means fluidly interconnecting said second chamber to said leakage passage means.

7. A pneumatic control device as set forth in claim 6 wherein said housing means comprises a plurality of housing members secured together, one of said housing members having said conduit means as an integral part thereof.

8. A pneumatic control device as set forth in claim 7 wherein said one housing member has means snap-fitting the same to another of said housing members to align said conduit means in said opening of said housing means to provide said leakage passage means about said conduit means.

9. A pneumatic control device as set forth in claim 6 wherein a movable valve member is carried by said housing means and is adapted to open and close said opening means of said one diaphragm means to respectively permit and prevent said fluid communication between said second and third chambers.

10. A pneumatic control device as set forth in claim 6 wherein said means for fluidly interconnecting said second chamber to said leakage passage means comprises a radial passage in said housing means.

11. In a pneumatic control system having a pneumatic source, a pneumatically operated device to be controlled, and signal means for directing a pilot pneumatic signal in relation to a desired output of said device, the improvement comprising a pneumatic control device having a housing means carrying two separate one-piece flexible diaphragms in stacked relation and cooperating therewith to define a pilot pressure chamber, an exhaust chamber, a branch pressure chamber and a main pressure chamber in stacked relation, means fluidly interconnecting said main pressure chamber to said pneumatic source, means fluidly interconnecting said branch pressure chamber to said pneumatically operated device, means interconnecting said pilot pressure chamber to said signal means, means fluidly interconnecting said exhaust chamber to the atmosphere, one of said diaphragms having opening means passing therethrough and defining opposed resilient valve seats respectively leading to said exhaust chamber and to said branch chamber, said housing means having a stationary valve seat being adapted to interconnect said main chamber and said branch chamber together, and a valve member disposed in said main chamber and projecting through said stationary valve seat into said branch chamber to control and be engageable by one of said resilient valve seats of said one diaphragm, said other resilient valve seat of said one diaphragm being controlled and engageable by the other of said diaphragms.

12. In a pneumatic control system as set forth in claim 11, the further improvement wherein said one diaphragm has an integral central enlargement projecting outwardly therefrom toward said other diaphragm, said opening means passing through said enlargement to define said other resilient valve seat of said one diaphragm at the free end of said enlargement.

13. In a pneumatic control system as set forth in claim 11, the further improvement wherein said housing means comprises a plurality of housing members disposed in stacked relation, one of the outboard housing members being substantially cup-shaped with a closed end and an open end, the remaining housing members being disposed in stacked relation in said open end of said cup-shaped housing member.

14. In a pneumatic control device system as set forth in claim 13, the further improvement wherein said one outboard housing member and the other housing member respectively have means snap-fitting the same together whereby said housing members are held together in stacked relation.

15. In a pneumatic control system as set forth in claim 11 the further improvement wherein said housing means comprises a plurality of housing members secured together in stacked relation, one of said housing members having nipple means fluidly interconnected to said pilot chamber, other of said housing members having aligned openings telescopically and loosely receiving said nipple means to define leakage passage means therebetween, said housing means having means fluidly interconnecting said exhaust chamber to said leakage passage means whereby said leakage passage means leads to the atmosphere and provides said means fluidly interconnecting said exhaust chamber to the atmosphere.

16. In a pneumatic control system having a pneumatic source, a pneumatically operated device, and signal means for directing a pneumatic signal to control said pneumatically operated device, the improvement comprising a pneumatic control device comprising a housing means carrying two diaphragm means in stacked relation and cooperating with said housing means to define a pilot chamber, an exhaust chamber and a pressure chamber in stacked relation, means for interconnecting said pressure source to said pressure chamber in relation to said pneumatic signal, means for interconnecting said pressure chamber to said pneumatically operated device, one of said diaphragm means having opening means passing therethrough fluidly interconnecting said exhaust chamber and said pressure chamber together, the other of said diaphragm means being adapted to open and close said opening means to respectively permit and prevent fluid communication between said exhaust and pressure chambers, said housing means having conduit means fluidly interconnecting said signal means with said pilot chamber, said housing means having an opening therein telescopically and loosely receiving said conduit means to define leakage passage means therebetween leading to the atmosphere exterior of said housing means, said device having means fluidly interconnecting said exhaust chamber to said leakage passage means.

17. In a pneumatic control system as set forth in claim 16, the further improvement wherein said housing means comprises a plurality of housing members secured together, one of said housing members having said conduit means as an integral part thereof.

18. In a pneumatic control system as set forth in claim 17, the further improvement wherein said one housing member has means snap-fitting the same to another of said housing members to align said conduit means in said opening of said housing means to provide said leakage passage means about said conduit means.

19. In a pneumatic control system as set forth in claim 16, the further improvement wherein a movable valve member is carried by said housing means and is adapted to open and close said opening means of said one diaphragm means to respectively permit and prevent said fluid communication between said exhaust and pressure chambers.

20. In a pneumatic control system as set forth in claim 16, the improvement wherein said means for fluidly interconnecting said exhaust chamber to said leakage passage means comprises a radial passage in said housing means.